J. H. MUMMA.
Straw Cutter.
No. 19,200.
Patented Jan. 26, 1858.
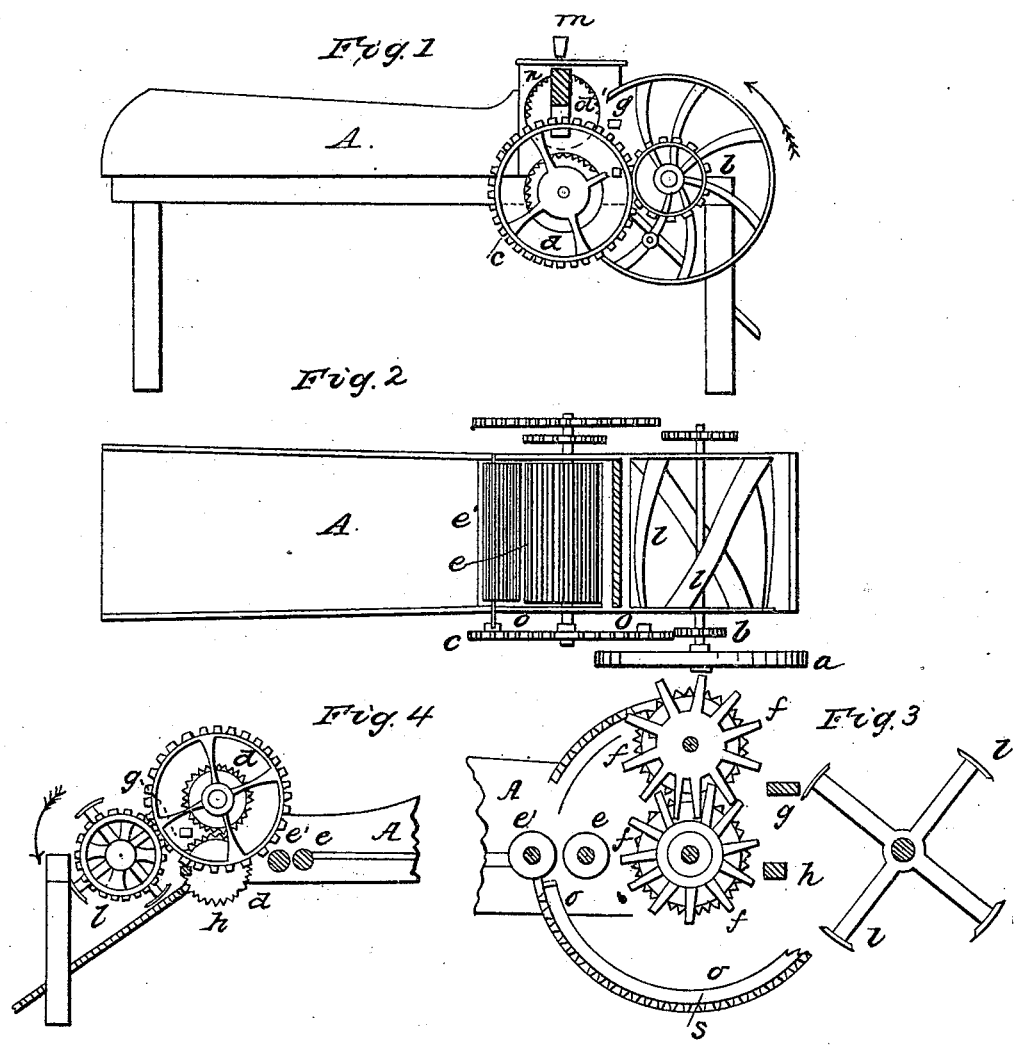

UNITED STATES PATENT OFFICE.

J. H. MUMMA, OF HARRISBURG, PENNSYLVANIA.

STRAW-CUTTER.

Specification forming part of Letters Patent No. 19,200, dated January 26, 1858; Reissued September 6, 1859, No. 808.

*To all whom it may concern:*

Be it known that I, JACOB H. MUMMA, of Harrisburg, in the county of Dauphin and State of Pennsylvania, have invented certain new and useful Improvements in Straw and Stalk Cutters; and I do hereby declare that the following is a full, clear, and exact description of the same, reference being had to the accompanying drawings, making a part of this specification.

Figure 1, shows an elevation with the hand or driving wheel, (which may serve as a band wheel when power is to be applied) also the gear wheel on the left side of the machine, used in cutting downward. Fig. 2, a bird eye view showing the left hand gear in mesh and that on the right hand side thrown out of gear. Fig. 3, an enlarged section of the pinions driving the crushing roller also the flute of said roller, meshing into each other. Fig. 4, shows the placing of the wheel, one on the cutter shaft and the other on the upper crushing roller instead of its being placed on the lower one, as shown in Fig. 1, for the purpose of cutting upward—which may be necessary when cutting dirty corn stalks.

It is well known to agriculturists that cut corn stalks properly prepared for use as fodder constitute a valuable adjunct but it is requisite that they should be divested of adhering soil; be crushed, and then cut into short pieces. To accomplish these three results in one machine I first employ rollers over which the stalks pass to the crushers, one of which rollers being subjected to a series of raps or knocks, so that the soil on the stalk is jarred off. Then the clean stalk passes between crushing cylinders or rollers to the cutting knives. In my improvement the knives are double edged that is both back and front of the knife is rendered sharp instead of only one edge. The object of the double edge and corresponding devices is to enable the operator by shifting from side to side of the machine to cut either upward or downward by a slight change of the mesh of the pinions. The crushing cylinders being provided with gum elastic springs allows them readily to accommodate themselves to the thickness of the feed. It will be noticed that the position of the feed rollers, relatively to the bottom of the trough of the cutter is such that while the soil from stalks or straw is allowed to fall clear of the knives the straw will be carried forward and cut and crushed. This allowance of clearing the soil from the machine keeps the knives a long time sharp.

To enable others to make and use my improved cutter, I would describe the machine as follows.

A is the trough in which the straw or stalks are to be placed.

$e'$, $e$, are feed rollers over which the straw, &c., passes. One of the rolls, viz., $e'$, has its journal projected out, so as to be struck by the tappets of the wheel $c$.

$d$ $d'$, are crushing cylinders or rollers. They are fluted so as to mesh with each other, and if not too far separated, they drive each other. The shafts of the crushers are furnished with wheels $f$ $f$, having long cogs.

$b$, is a pinion on the shaft carrying the knives or cutters; it meshes with a wheel $c$ on the lower crushing cylinder, $d$, when thus meshing the machine cuts downward as seen in Fig. 1.

$g$, is the lower shear bar and $h$ the upper one, it is against either the one or the other that the blades or knives or cutters $l$ $l$ pass in cutting.

To change the cut upward, the wheel $c$ may be shifted to the left side of the machine, placing it on the upper crushing cylinder $d'$; or if desired a second wheel like $c$ may be placed on the shaft of the upper mashing or crushing cylinder, that can be thrown in or out of gear when requisite: in that case the wheels on the side shown in Fig. 1, must be thrown out of gear for cutting upward as shown in Fig. 4.

$l$, $l$, are the double edged blades or cutters having both edges ground to cut either up or down as the machine may be moved. See Fig. 3.

M, is a tightening screw, acting on the india rubber spring $n$; which by suitable boxes bears upon the journals of the upper crushing cylinder $d'$. The gum spring are found greatly superior to helical springs of wire or other metal springs, as the gum readily accommodates itself to differences of feed.

$o$, $o$, are tappets or projections on the inside face of the cog wheel $c$, as these tappets come in contact with the projecting axle of the feed roller $e'$ they give it a rap and thus jar the material as it passes over the roller: thus divesting the stalks &c. of adhering soil, which falls between the rollers, by this means the knives are kept much longer keen or sharp: and the fodder freed from grit or soil.

Having fully described my improvement in straw and stalk cutters what I claim as my invention and desire to secure by Letters Patent is, The arrangement of the feed rollers ($e, e'$) operated on by tappets ($o\ o$); crushing cylinders ($d\ d'$) provided with gum springs ($n, n,$) cutter bars ($g$ and $h$) and cutters ($l\ l$) substantially in the manner and for the purposes set forth in the foregoing specification.

JACOB H. MUMMA.

Witnesses:
   C. A. SNYDER.
   JOHN S. DETWEILER.

[FIRST PRINTED 1911.]